US008216661B2

(12) United States Patent
Kelly et al.

(10) Patent No.: US 8,216,661 B2
(45) Date of Patent: Jul. 10, 2012

(54) VARIABLE GLOSS FUSER COATING MATERIAL COMPRISED OF A POLYMER MATRIX WITH THE ADDITION OF ALUMINA NANO FIBERS

(75) Inventors: Matthew M. Kelly, Webster, NY (US); David J. Gervasi, Pittsford, NY (US); Alan Richard Kuntz, Webster, NY (US); Rebecca M. Hainley, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 12/907,431

(22) Filed: Oct. 19, 2010

(65) Prior Publication Data

US 2012/0094081 A1 Apr. 19, 2012

(51) Int. Cl.

| | |
|---|---|
| ***D06N 7/04*** | (2006.01) |
| *D06N 7/02* | (2006.01) |
| *B32B 3/18* | (2006.01) |
| *B32B 18/00* | (2006.01) |
| *B32B 5/16* | (2006.01) |
| *B32B 27/00* | (2006.01) |

(52) U.S. Cl. .................... 428/141; 428/32.71; 428/34.4; 428/34.5; 428/323; 428/325; 428/327; 428/408; 428/421; 428/422; 492/28; 492/49; 492/53; 492/56; 399/67; 399/69; 399/122; 399/176; 399/328; 399/330; 399/331; 399/333; 399/335; 430/124.1; 430/124.3

(58) Field of Classification Search ............... 428/32.71, 428/34.4, 34.5, 141, 323, 325, 327, 408, 428/421, 422; 492/28, 49, 53, 56; 399/67, 399/69, 122, 176, 320, 328, 330, 331, 333, 399/335; 430/124, 124.1, 124.3

See application file for complete search history.

(56) References Cited

U.S. PATENT DOCUMENTS

| | | | | |
|---|---|---|---|---|
| 4,518,655 | A * | 5/1985 | Henry et al. | 428/329 |
| 5,413,888 | A | 5/1995 | Sacripante et al. | |
| 5,499,088 | A * | 3/1996 | Menjo | 399/321 |
| 6,395,444 | B1 * | 5/2002 | Riehle et al. | 399/320 |
| 7,336,920 | B2 | 2/2008 | Anderson et al. | |
| 7,831,164 | B2 | 11/2010 | Barton | |
| 2003/0049056 | A1 * | 3/2003 | Finn et al. | 399/333 |
| 2006/0292360 | A1 * | 12/2006 | Hays et al. | 428/323 |
| 2009/0110453 | A1 | 4/2009 | Kuntz et al. | |

* cited by examiner

*Primary Examiner* — David R Sample
*Assistant Examiner* — Kendra Keith
(74) *Attorney, Agent, or Firm* — MH2 Technology Law Group LLP

(57) ABSTRACT

Exemplary embodiments provide materials, methods, and systems for a fuser member used in electrophotographic devices and processes, wherein the fuser member can include a coating material containing a plurality of nanoceram fibers dispersed in a polymer matrix for providing a desired gloss level of fused toner images.

20 Claims, 7 Drawing Sheets

VARIABLE GLOSS FUSER COATING MATERIAL COMPRISED OF A POLYMER MATRIX WITH THE ADDITION OF ALUMINA NANO FIBERS

DETAILED DESCRIPTION

1. Field of the Use

The present teachings relate generally to coating materials for electrophotographic devices and processes and, more particularly, to coating materials that contain nano-fibers for providing variable image gloss levels.

2. Background

Electrophotographic marking is performed by exposing a light image representation of a desired document onto a substantially uniformly charged photoreceptor. In response to that light image, the photoreceptor discharges to create an electrostatic latent image of the desired document on the photoreceptor's surface. Toner particles are then deposited onto that latent image to form a toner image. That toner image is then transferred from the photoreceptor onto a substrate such as a sheet of paper. The transferred toner image is then fused to the substrate, using heat and/or pressure. The surface of the photoreceptor is then cleaned of toner residue and recharged in preparation for production of another image.

Gloss is a property of a surface that relates to specular reflection. Specular reflection is a sharply defined light beam resulting from reflection off a smooth, uniform surface. Gloss follows the law of reflection which states that when a ray of light reflects off a surface, the angle of incidence is equal to the angle of reflection. Gloss properties are generally measured in Gardner Gloss Units (ggu) by a gloss meter.

Gloss acceptability levels for copies and prints are dependent on the market segment involved. On color production prints, a particular level of image gloss is typically desired. The level of image gloss is significantly impacted by the toner formulation used in the printing process. Conventionally, the level of image gloss is further controlled by using additional equipment to adjust the image gloss after the fusing operation. It is desirable, however, to control the image gloss level without using additional equipment.

SUMMARY

According to various embodiments, the present teachings include a fuser member. The fuser member can include a substrate and a coating material having an average surface roughness ranging from about 0.1 μm to about 1.5 μm disposed over the substrate. The coating material can include a polymer matrix and a plurality of nanoceram fibers disposed in the polymer matrix in a form selected from the group consisting of a non-agglomerated nano-fiber, a nano-fiber cluster, and a combination thereof.

According to various embodiments, the present teachings also include a fusing method. The fusing method can include first forming a contact arc between a coating material of a fuser roll and a backup member. The coating material can include a plurality of nanoceram fibers disposed in a polymer matrix, and the coating material can have an average surface roughness ranging from about 0.1 μm to about 1.5 μm. When fusing, a print medium can be passed through the contact arc such that toner images on the print medium contact the coating material and are fused on the print medium. The fused toner images on the print medium can have a gloss level ranging from about 30 ggu to about 70 ggu.

According to various embodiments, the present teachings further include a fusing system that includes a fuser roll and a backup roll. The fuser roll can include an outermost layer including a plurality of nanoceram fibers disposed in a polymer matrix in a form selected from the group consisting of a non-agglomerated nano-fiber, a nano-fiber cluster, and a combination thereof. The backup roll can be configured to form a contact arc with the fuser roll to fuse toner images on a print medium that passes through the contact arc. The outermost layer of the fuser roll can have an average surface roughness ranging from about 0.1 μm to about 1.5 μm such that the fused toner images have a gloss level ranging from about 30 ggu to about 70 ggu.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
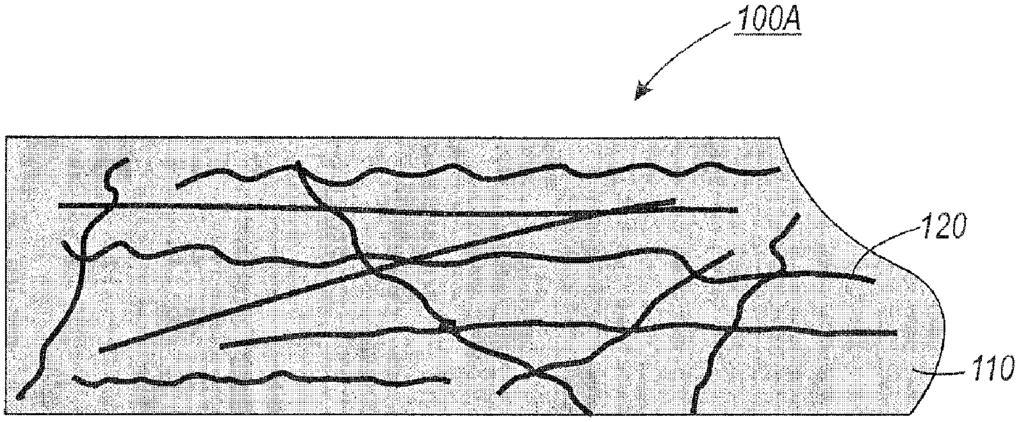
FIGS. 1A-1F depict exemplary coating materials in accordance with various embodiments of the present teachings.
Figure 1B:
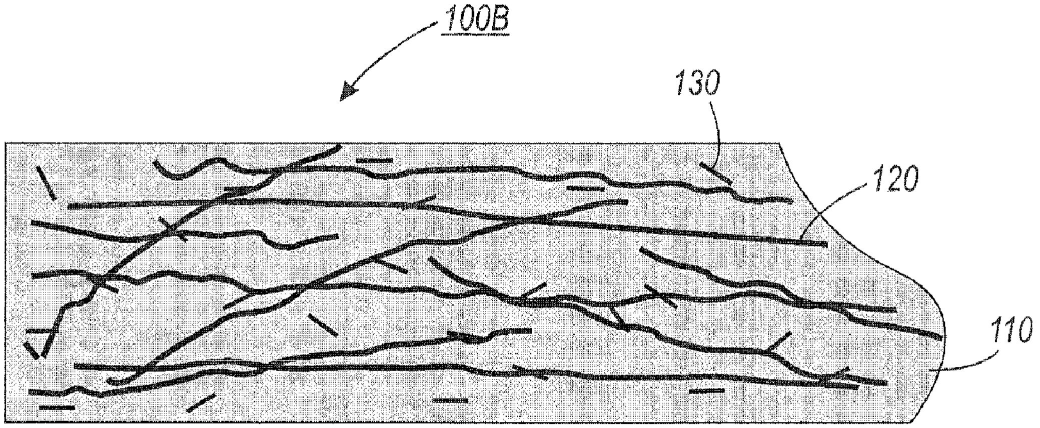

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide coating materials useful for electrophotographic devices and processes. The coating materials can include a plurality of nanoceram fibers dispersed, distributed, and/or agglomerated in a polymer matrix. The coating materials can be used as an outermost layer for electrophotographic members and devices including, but not limited to, a fuser member or other fixing members, a pressure member, and/or a release donor member so as to control or improve, for example, fusing performances, printing performances, and/or thermal, mechanical and electrical properties of the electrophotographic members.

As used herein, unless otherwise specified, the term "nano-fiber" refers to an elongated structure, for example, a fibrous particulate, having at least one dimension, e.g., width or diameter, less than about 1000 nm and having an average aspect ratio ranging from about 10 to about 100, or from about 10 to about 50, or from about 10 to about 20. Generally, the aspect ratio is a ratio of a longest dimension to a shortest dimension of the nano-fiber, such as a ratio of the length to the diameter of the nano-fiber. The nano-fibers can have an average length ranging from about 20 nm to about 400 nm, or from about 20 nm to about 200 nm, or from about 20 nm to about 80 nm, and an average width or diameter ranging from about 2 nm to about 4 nm, or from about 2 nm to about 3 nm, or from about 2 nm to about 2.5 nm. In one embodiment, the nano-fibers can be about 2 nm in diameter and about 50 nm to about 1000 nm in length.

In embodiments, the nano-fibers can include various cross-sectional shapes including, but not limited to, a circular, square, rectangular, and/or triangular shape. The nano-fibers can have an average surface area, for example, ranging from about 450 $m^2/g$ to about 600 $m^2/g$, or from about 450 $m^2/g$ to about 500 $m^2/g$, or from about 450 $m^2/g$ to about 475 $m^2/g$. In one embodiment, the nano-fibers can have an average surface area of about 600 $m^2/g$.

As used herein, unless otherwise specified, the term "nano-ceram fiber" refers to a nano-fiber that is primarily made of ceramic materials. Exemplary ceramic materials used for nanoceram fibers can include, but are not limited to, alumina, silica, zirconia, titania, silicon carbide, silicon nitride, tungsten carbide, or other ceramics. In one embodiment, the nano-ceram fibers can be alumina ceramic fibers. In embodiments, the ceramic nano-fibers can include, for example, a calcined ceramic, a tabular ceramic, a fused ceramic, and/or a fumed ceramic. As disclosed herein, the nanoceram fibers dispersed in a polymer matrix can be of only one type or a mixture of two or more ceramic types selected from the above described ceramics, which can be used in the same or different, amounts and fiber sizes, in the polymer matrix.

Figure 1C:
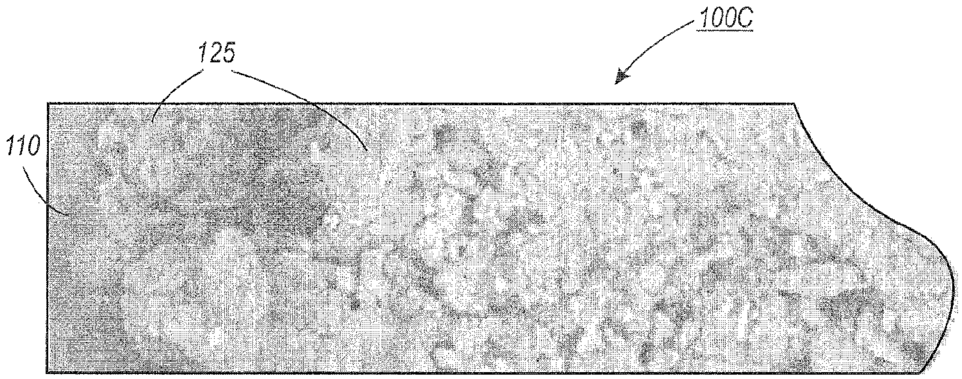
Figure 1D:
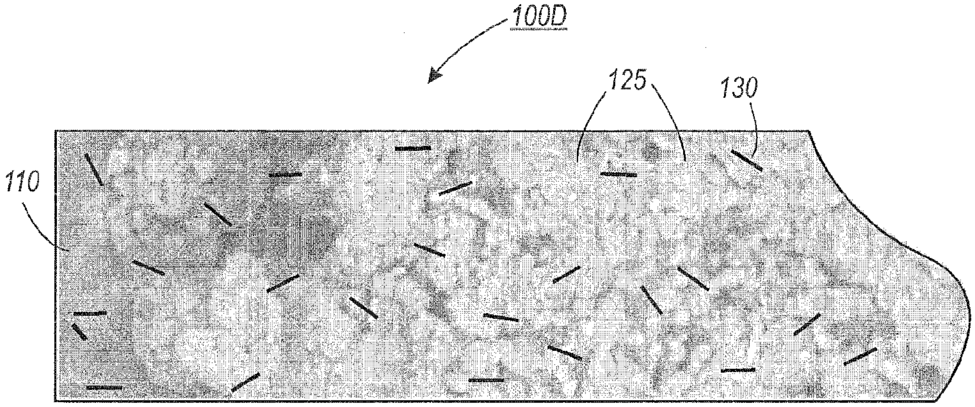
Figure 1E:
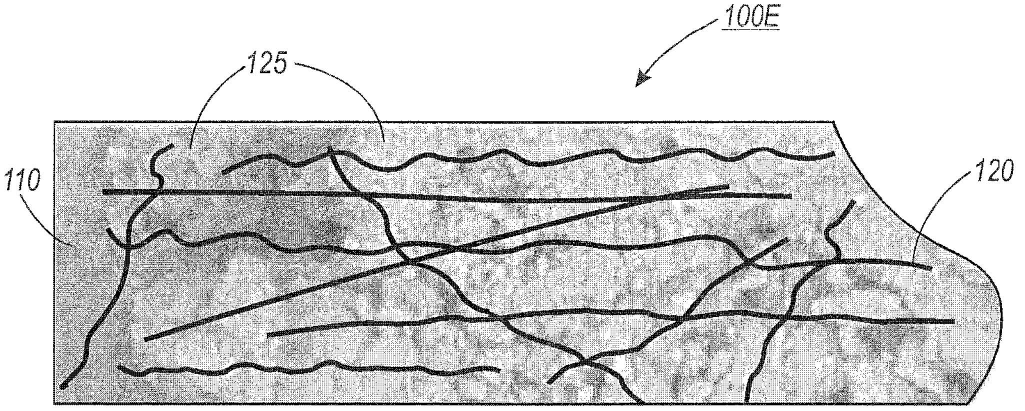
Figure 1F:
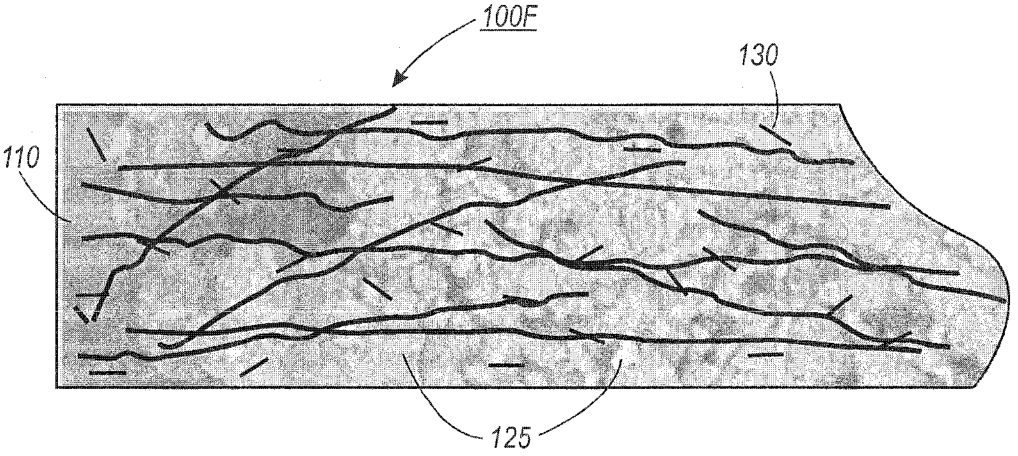

In embodiments, a plurality of nano-fibers can be disposed in a polymer matrix as non-agglomerated nano-fibers (see 120 of FIGS. 1A-1B, and 1E-1F), nano-fiber clusters (see 125 of FIGS. 1C-1F), or a combination thereof (see FIGS. 1E-1F). For example, clusters can be included in the exemplary coating materials. The clusters can be formed from agglomeration of the disclosed nano-fibers (e.g., nanoceram fibers). The nano-fiber clusters can have an average size ranging from about 5 microns to about 20 microns; or from about 5 microns to about 15 microns; or from about 5 microns to about 10 microns. As used herein, the average cluster size refers to an average size of any characteristic dimension of a nano-fiber cluster based on the shape of the cluster, e.g., the median grain size by weight (d50) as known to one of ordinary skill in the art. For example, the average cluster size can be given in terms of the diameter of substantially spherical particles or nominal diameter for irregular shaped clusters. Further, the shape of the clusters is not limited in any manner. Such nano-fiber clusters can take a variety of cross-sectional shapes, including round, oblong, square, euhedral, etc.

Specifically, FIGS. 1A-1F depict exemplary coating materials 100A-F in accordance with various embodiments of the present teachings. As shown, the coating material 100A-100F can include a plurality of non-agglomerated nano-fibers 120 and/or a plurality of nano-fiber clusters 125. Note that the plurality of non-agglomerated nano-fibers 120 (or nano-fiber clusters 125) depicted in FIGS. 1A-1F can have same or different sizes or shapes in the polymer matrix 110 and other fibers/fillers/polymers can be added or existing fibers/fillers; polymers can be removed or modified.

The non-agglomerated nano-fibers 120 and/or nano-fiber clusters 125 can be distributed within the polymer matrix 110 to substantially control or enhance physical properties, such as, for example, thermal conductivity, and/or mechanical robustness of the resulting polymer matrix, as well as fusing performances, and/or printing performances. For example, the coating material can be used as an outermost layer of a fuser member in a variety of fusing subsystems and embodiments, wherein the coating materials can provide improved gloss performance of the fused images depending on the polymers involved in the polymer matrix.

Various polymers can be used for the polymer matrix 110 to provide desired properties according to specific applications. The polymers used for the polymer matrix 110 can include, but are not limited to, silicone elastomers, fluoroelastomers, fluoroplastics, thermoelastomers, fluororesins, and/or resins.

In one embodiment, the polymer matrix 110 can include fluoroelastomers, e.g., having a monomeric repeat unit selected from the group consisting of tetrafluoroethylene (TFE), perfluoro(methyl vinyl ether), perfluoro(propyl vinyl ether), perfluoro(ethyl vinyl ether), vinylidene fluoride (VDF or VF2), hexafluoropropylene (HFP), and a mixture thereof. The fluoroelastomers can also include a curing site monomer.

Commercially available fluoroelastomers can include, for example, VITON® A: copolymers of hexafluoropropylene (HFP) and vinylidene fluoride (VDF or VF2); VITON® B: terpolymers of tetrafluoroethylene (TFE), vinylidene fluoride (VDF) and hexafluoropropylene (HFP); VITON® GF: tetrapolymers of TFE, VF2, HFP); as well as VITON® E; VITON® E-60C; VITON® E430; VITON® 910; VITON® GH; and VITON® GF. The VITON® designations are Trademarks of E.I. DuPont de Nemours, Inc. (Wilmington, Del.) and are also referred herein as "VITON."

Other commercially available fluoroelastomers can include those available from 3M Corporation (St. Paul, Minn.) including, for example, DYNEON™ fluoroelastomers, AFLAS® fluoroelastomers (e.g., a poly(propyiene-tetrafluoroethylene)), and FLUOREL® fluoroelastomers (e.g. FLUOREL®II (e.g., LII900) a poly(propylene-tetrafluoroethylenevinylidenefluoride), FLUOREL® 2170, FLUOREL® 2174, FLUOREL® 2176, FLUOREL® 2177, and/or FLUOREL® LVS 76. Additional commercially available fluoroelastomer materials can include the "tecnoflons" identified as FOR®-60KIR, FOR®-LHF, FOR®-NM, FOR®-THF, FOR®-TFS, FOR®-TH, and FOR®-TN505, available from Solvay Solexis (West Deptford, N.J.).

In embodiments, the polymer matrix 110 can include polymers cross-linked with an effected curing agent (also referred to herein as cross-linking agent, or cross-linker) to form elastomers that are relatively soft and display elastic properties. For example, when the polymer matrix uses a vinylidene-fluoride-containing fluoroelastomer, the curing agent can include, a bisphenol compound, a diamino compound, an aminophenol compound, an amino-siloxane compound, an amino-silane, and/or a phenol-silane compound. An exemplary bisphenol cross-linker can be VITON® Curative No. 50 (VC-50) available from E. I. du Pont de Nemours, Inc. VC-50 can be soluble in a solvent suspension and can be readily available at the reactive sites for cross-linking with, for example, VITON®-GF (E. I. du Pont de Nemours, Inc.).

The polymer matrix 110 can include fluoroplastics including, but not limited to, PFA (polyfluoroalkoxypolytetrafluoroethylene), PTFE (polytetrafluoroethylene), and/or FEP (fluorinated ethylenepropylene copolymer). These fluoroplastics can be commercially available from various designations, such as TEFLON® PFA, TEFLON® PTFE, or TEFLON® FEP available from E.I. DuPont de Nemours, Inc. (Wilmington, Del.).

In FIG. 1C, the exemplary coating material 100C can include nano-fibers in a form of nano-fiber clusters 125 dispersed randomly or uniformly in the polymer matrix 110. In FIG. 1E, the exemplary coating material 100E can include nano-fibers in a form of a plurality of non-agglomerated nano-fibers 120 and a plurality of nano-fiber clusters 125 each dispersed randomly or uniformly in the polymer matrix 110.

In embodiments, various other particle fillers including conventional particle fillers can be optionally included in the disclosed coating materials. As exemplarily shown in FIGS. 1B, 1D, and 1F, a plurality of particle fillers 130 can be dispersed within the polymer matrix 110 that already contains the non-agglomerated nano-fibers 120 and/or the nano-fiber clusters 125.

The particle fillers 130 can have dimensions on the micron and/or nano-scales. The particle fillers 130 can be organic, inorganic, or metallic and can include conventional composite filler materials of, for example, metals or metal oxides including copper particles, copper flakes, copper needles, aluminum oxide, nano-alumina, titanium oxide, silver flakes, aluminum nitride, nickel particles, silicon carbide, silicon nitride, etc.

In embodiments, the plurality of nano-fibers in one or more forms of the non-agglomerated nano-fibers 120 (e.g., nanoceram fibers), and the nano-fiber clusters 125 (e.g., nanoceram fiber clusters) shown in FIGS. 1A-1F can be present in the coating material 100A-B in an amount ranging from about 0.01% to about 60%, or from about 1% to about 30%, or from about 5% to about 15% by weight of the total coating material. The number of combinations of the non-agglomerated nano-fibers 120 and nano-fiber clusters 125 contemplated by the present disclosure is not limited.

For example, when the forms of the non-agglomerated nano-fibers 120 (e.g., nanoceram fibers) and the nano-fiber clusters 125 (e.g., nanoceram fiber clusters) are both present in the polymer matrix 110 as shown in FIGS. 1E-1F, a ratio of the nano-fiber clusters 125 to the non-agglomerated nano-fibers 120 can range from about 20 to about 1, or from about 10 to about 1, or from about 5 to about 1 by weight.

In embodiments, the coating materials 100A-F can provide desirable average surface roughness, for example, ranging from about 0.01 μm to about 3.0 μm, or from about 0.1 μm to about 1.5 μm, or from about 0.5 μm to about 1.0 μm. For example, this surface roughness can facilitate controlling of image gloss levels when the coating materials are used as fuser member materials during electrophotographic printing.

The coating materials 100A-F can provide desirable mechanical properties. For example, the coating materials 100A-F can have a tensile strength ranging from about 500 psi to about 5,000 psi, or from about 1,000 psi to about 4,000 psi, or from about 1,500 psi to about 3,500 psi; an elongation % ranging from about 20% to about 1000%, or from about 50% to about 500%, or from about 100% to about 400%; a toughness ranging from about 500 in.-lbs./in.$^3$ to about 10,000 in.-lbs./in.$^3$, or from about 1,000 in.-lbs./in.$^3$ to about 5,000 or from about 2,000 in.-lbs./in.$^3$ to about 4,000 in.-lbs./in.$^3$; and an initial modulus ranging from about 100 psi to about 2,000 psi, or from about 500 psi to about 1,500 psi, or from about 800 psi to about 1,000 psi.

The coating materials 100A-F can provide a desirable average thermal diffusivity ranging from about 0.01 mm$^2$/s to about 0.5 mm$^2$/s, or from about 0.05 mm$^2$/s to about 0.25 mm$^2$/s, or from about 0.1 mm$^2$/s to about 0.15 mm$^2$/s, and a desirable average thermal conductivity ranging from about 0.01 W/mK to about 1.0 W/mK, or from about 0.1 W/mK to about 0.75 W/mK, or from about 0.25 W/mK to about 0.5 W/mK.

In various embodiments, the disclosed coating materials 100A-F can be used in any suitable electrophotographic members and devices. For example, FIG. 2 depicts an exemplary electrophotographic member 200 in accordance with various embodiments of the present teachings. The member 200 can be, for example, a fuser member, a pressure member, and/or a donor member used in electrophotographic devices. The member 200 can be in a form of, for example, a roll, a drum, a belt, a drelt, a plate, or a sheet.

As shown in FIG. 2, the member 200 can include a substrate 205 and an outermost layer 255 formed over the substrate 205.

The substrate 205 can be made of a material including, but not limited to, a metal, a plastic, and/or a ceramic. For example, the metal can include aluminum, anodized aluminum, steel, nickel, and/or copper. The plastic can include polyimide, polyester, polyetheretherketone (PEEK), poly (arylene ether), and/or polyamide.

As illustrated, the member 200 can be, for example, a fuser roller including the outermost layer 255 formed over an exemplary core substrate 205. The core substrate can take the form of, e.g., a cylindrical tube or a solid cylindrical shaft, although one of the ordinary skill in the art would understand that other substrate forms, e.g., a belt substrate, can be used to maintain rigidity and structural integrity of the member 200.

Figure 2A:
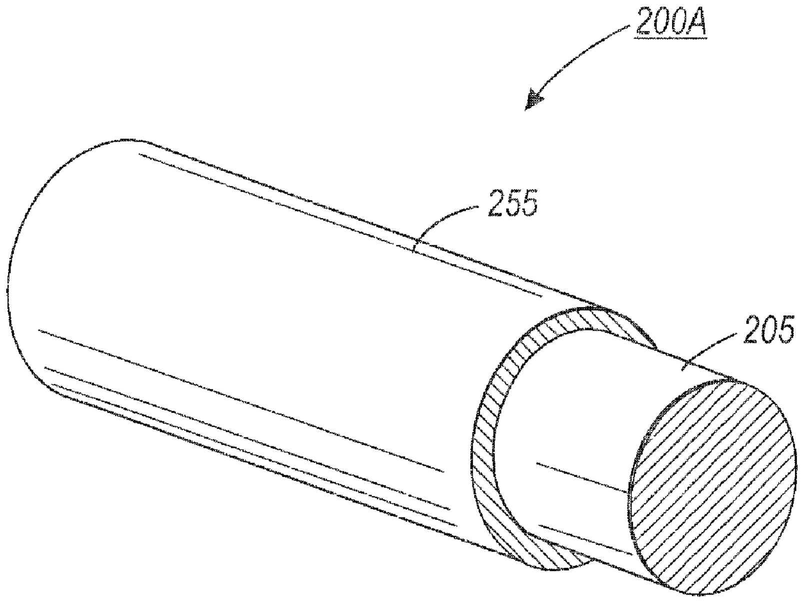
FIGS. 2A-2B depict exemplary fuser members using the coating materials of FIGS. 1A-1F in accordance with various embodiments of the present teachings.

The outermost layer 255 can include, for example, the coating material 100A-100F as shown in FIGS. 1A-1F. The outermost layer 255 can thus include a plurality of nano-fibers in a form of a non-agglomerated nano-fiber, a nano-fiber cluster, and a combination thereof, and optionally particle fillers such as metals or metal oxides, dispersed within a polymer matrix. As shown in FIG. 2A, the outermost layer 255 can be formed directly on the substrate 205. In various other embodiments, one or more additional functional layers, depending on the member applications, can be formed between the outermost layer 255 and the substrate 205.

For example, the member 200B can have a 2-layer configuration having a compliant/resilient layer 235, such as a silicone rubber layer, disposed between the outermost layer 255 and the core substrate 205. In another example, the exemplary fuser member 200 can include an adhesive layer (not shown), for example, formed between the resilient layer 235 and the substrate 205 or between the resilient layer 235 and the outermost layer 255.

In one embodiment, the exemplary fuser member 200A-B can be used in a conventional fusing system to improve fusing performances as disclosed herein. FIG. 3 depicts an exemplary fusing system 300 using the disclosed member 200A or 200B of FIGS. 2A-2B.

The exemplary system 300 can include the exemplary fuser roll 200A or 200B having an outermost layer 255 over a suitable substrate 205. The substrate 205 can be, for example, a hollow cylinder fabricated from any suitable metal. The fuser roll 200 can further have a suitable heating element 306 disposed in the hollow portion of the substrate 205 which is coextensive with the cylinder. Backup or pressure roll 308, as known to one of ordinary skill in the art, can cooperate with the fuser roll 200 to form a nip or contact arc 310 through which a print medium 312 such as a copy paper or other print substrate passes, such that toner images 314 on the print medium 312 contact the outermost layer 255 during the fusing process. The fusing process can be performed at a temperature ranging from about 60° C. (140° F.) to about 300° C. (572° F.), or from about 93° C. (200° F.) to about 232° C. (450° F.), or from about 160° C. (320° F.) to about 232° C. (450° F.). Optionally, a pressure can be applied during the fusing process by the backup or pressure roll 308. Following the fusing process, after the print medium 312 passing through the contact arc 310, fused toner images 316 can be formed on the print medium 312.

As disclosed herein, the gloss output of the fused toner images 316 on the print medium 310 can be controlled by using the nano-fiber-containing coating materials as the outermost layer of the fuser member. Depending on the polymers selected for the polymer matrix or the nano-fibers, suitable levels of image gloss can be obtained as desired. For example, conventional fuser materials produce images with a gloss level greater than 70 ggu in iGen configurations, while the exemplary fuser materials including nano-fibers can produce images with controllable, e.g., reduced, gloss level of the fused or printed images of less than about 70 ggu, for example, in a range from about 30 ggu to about 70 ggu, or from about 40 ggu to about 60 ggu, or from about 45 ggu to about 55 ggu.

In addition to controlling the gloss level of fused images, the disclosed coating materials can also provide desired physical properties for the fuser members. In an exemplary embodiment, a coating material having about 15% nanoceram fibers by weight in a VITON® GF polymer matrix can have a thermal conductivity of about 0.28 $Wm^{-1}K^{-1}$, while conventional fuser rolls without using the nano-fibers exhibit a thermal conductivity of less than about 0.17 $Wm^{-1}K^{-1}$. The improved thermal conductivities can provide fast ramp up times during fusing.

Figure 2B:
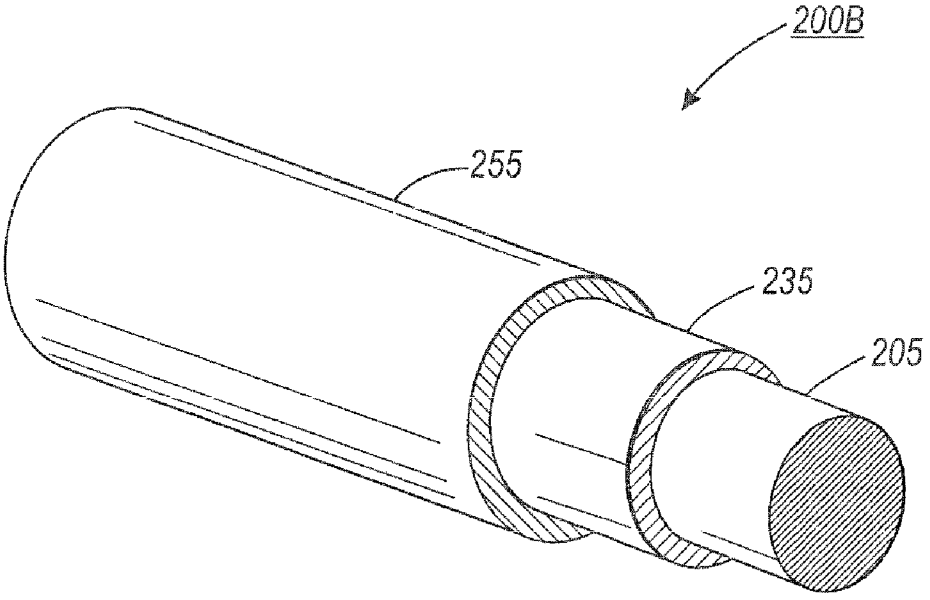
Figure 3:
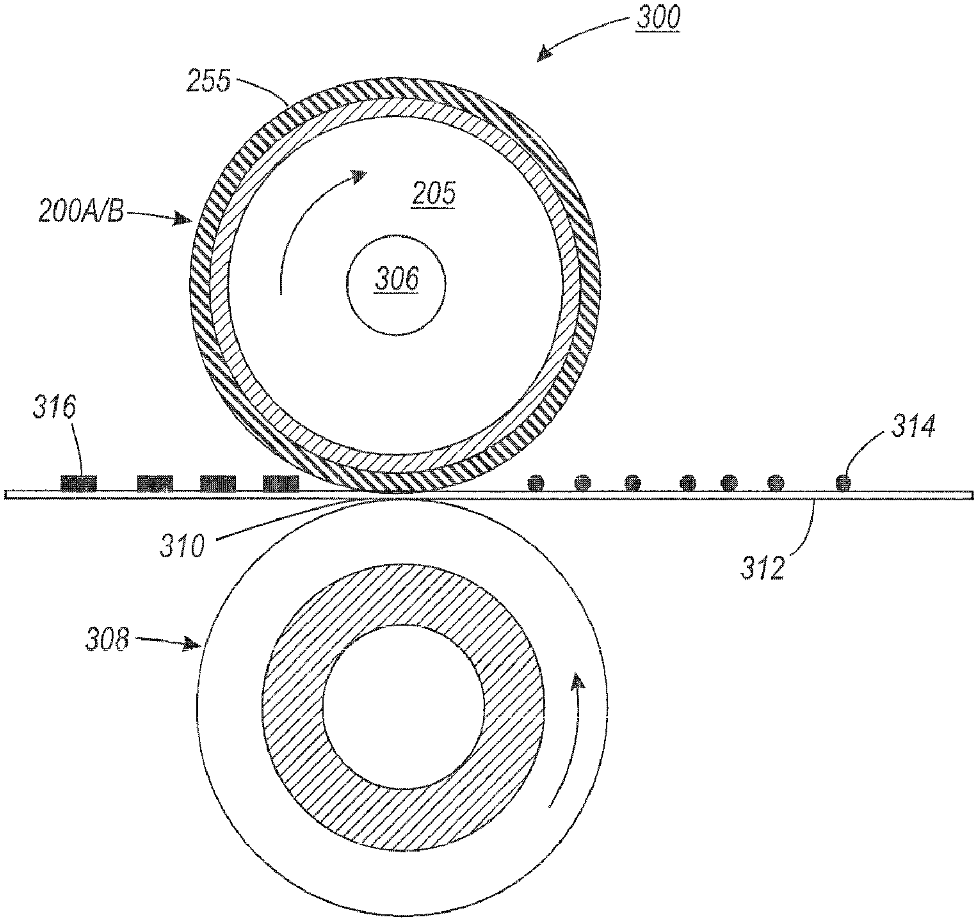
FIG. 3 depicts an exemplary fusing system having the fuser members of FIGS. 2A-2B in accordance with various embodiments of the present teachings.

Various embodiments can also include methods for forming the disclosed coating materials (see FIGS. 1A-1F) and for forming the exemplary fusing members (see FIGS. 2A-2B and FIG. 3). For example, FIG. 4 depicts a method for forming an exemplary fuser member in accordance with various embodiments of the present teachings.

Figure 4:
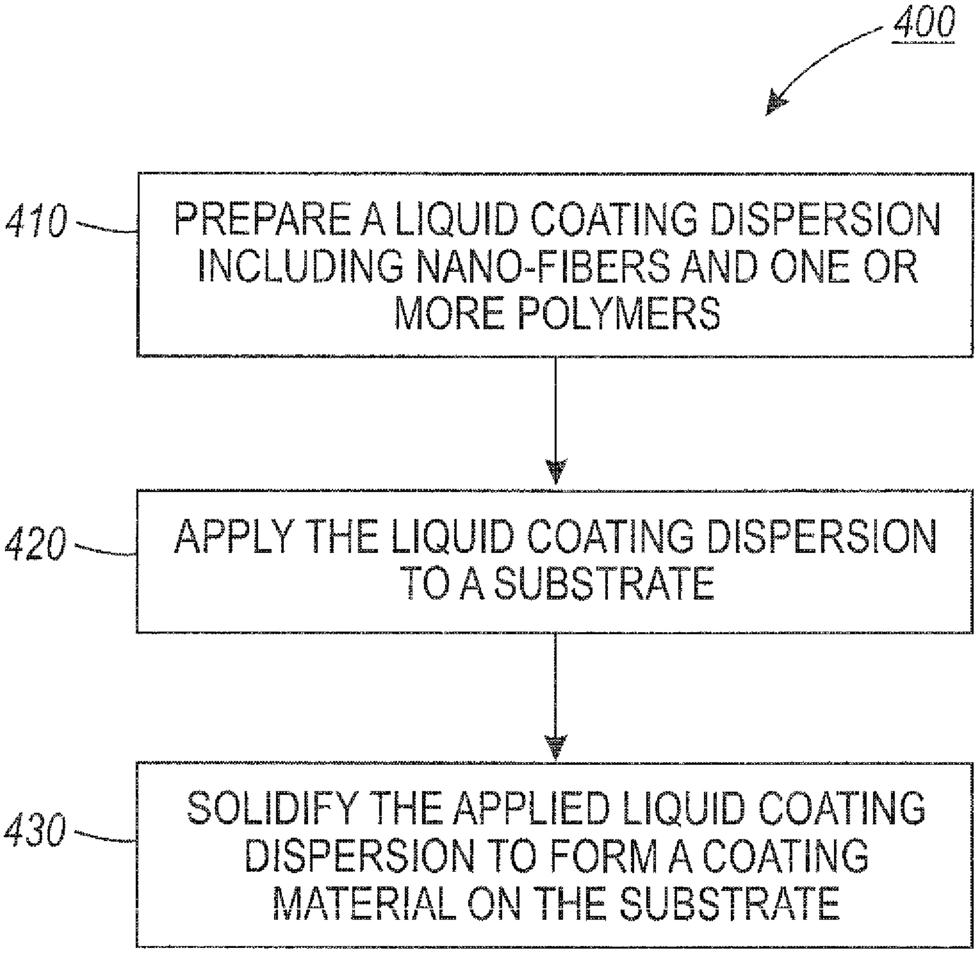
FIG. 4 depicts an exemplary method for forming the coating materials and the fuser members of FIGS. 1-2 in accordance with various embodiments of the present teachings.

At 410 in FIG. 4, a liquid coating dispersion can be prepared to include, for example, a desired polymer (e.g., VITON® GF) and nano-fibers, for example, nanoceram fibers, in a suitable solvent depending on the desired polymer and/or the nano-fibers used. Various solvents including, but not limited to, water, methyl ethyl ketone (MEK), methyl isobutyl ketone (MIBK), methyl-tertbutyl ether (MTBB), methyl n-amyl ketone (MAK), tetrahydrofuran (THF), Alkalis, methyl alcohol, ethyl alcohol, acetone, ethyl acetate, butyl acetate, or any other low molecular weight carbonyls, polar solvents, fireproof hydraulic fluids, along with the Wittig reaction solvents such as dimethyl formamide (DMF), dimethyl sulfoxide (DMSO) and N-methyl 2 pyrrolidone (NMP), can be used to prepare the liquid coating dispersion.

For example, the liquid coating dispersion can be formed by first dissolving the polymer in a suitable solvent, followed by adding a plurality of nano-fibers into the solvent in an amount to provide desired properties, such as a desired fusing properties, thermal conductivities, or mechanical robustness. In another example, the liquid coating dispersion can be formed by first mixing the polymer and a plurality of nano-fibers, followed by dissolving or dispersing the mixture in an appropriate solvent as described above.

In various embodiments, when preparing the liquid coating dispersion, a mechanical aid, such as an agitation, sonication and/or attritor ball milling/grinding, can be used to facilitate the mixing of the dispersion. For example, an agitation set-up fitted with a stir rod and Teflon blade can be used to thoroughly mix the nano-fibers with the polymer in the solvent, after which additional chemical curatives, such as curing agent, and optionally other particle fillers such as metal oxides, can be added into the mixed dispersion.

At 420, an exemplary fuser member can be formed by applying an amount of the liquid coating dispersion to a substrate, such as the substrate 205 in FIGS. 2A-2B. The application of the liquid coating dispersion to the substrate can include a process of deposition, coating, printing, molding, and/or extrusion. In an exemplary embodiment, the liquid coating dispersion, i.e., the reaction mixture, can be spray coated, flow coated, and/or injection molded onto the substrate.

At 430, the applied liquid coating dispersion can then be solidified, e.g., by a curing process, to form a coating layer, e.g., the layer 255, on the substrate, e.g., the substrate 205 of FIG. 2. The curing process can include, for example, a drying process and/or a step-wise process including temperature ramps. Depending on the dispersion composition, various curing schedules can be used. In various embodiments, following the curing process, the cured member can be cooled, e.g., in a water bath and/or at room temperature.

In embodiments, the solidified coating layer, i.e., the outermost layer of the fuser member can have a thickness ranging from 5 μm to about 100 μm, or from about 10 μm to about 75 μm, or from about 15 μm to about 50 μm. In embodiments, additional functional layer(s) (see 235 of FIG. 2B) can be formed prior to or following the formation of the coating material over the substrate.

EXAMPLES

Figure 5:
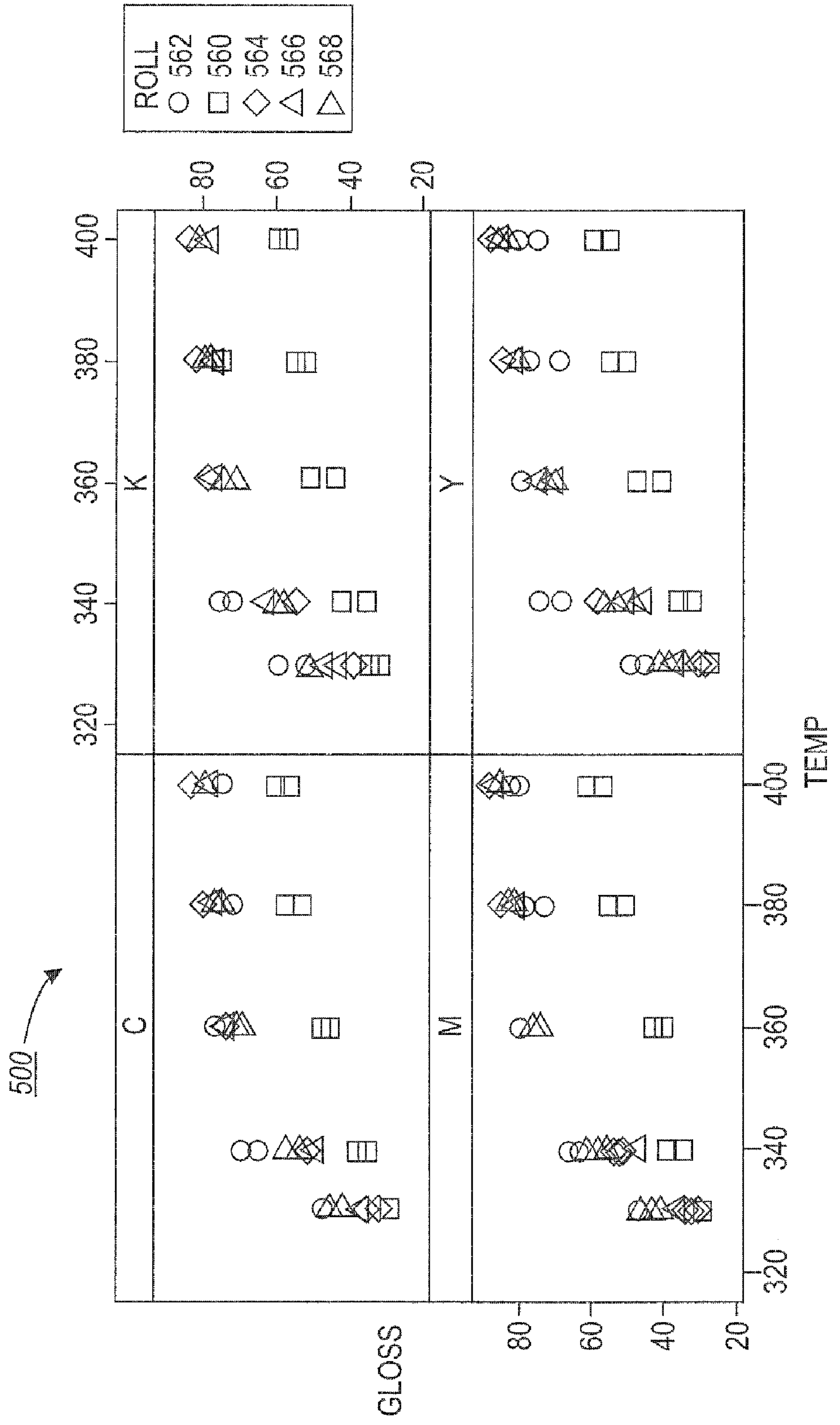
FIG. 5 compares image gloss results of an exemplary fuser member with conventional fuser members in accordance with various embodiments of the present teachings.

The outermost layer of the exemplary fuser member was formed to have a concentration of about 15% by weight of nanoceram fibers in a VITON® GF topcoat fuser material, which was coated on a conventional iGen fuser roll. FIG. 5 compares image gloss results fused using an exemplary fuser member (see data points of 560) and conventional fuser members (see data points of 562, 564, 566, and 568) at various fusing temperatures. As indicated by FIG. 5, lower gloss levels as desired were obtained by using the exemplary fuser member having the disclosed coating materials.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:

a substrate; and a coating material having an average surface roughness ranging from about 0.1 μm to about 1.5 μm disposed over the substrate, wherein the coating material comprises, a polymer matrix, and a plurality of ceramic nanofibers (a) dispersed in the polymer matrix as nano-fiber clusters having an average cluster size ranging from about 5 μm to about 20 μm or (b) disposed in the polymer matrix as a combination of nano-fiber clusters and non-agglomerated nano-fibers at a ratio of from about 20 to about 1 by weight (nano-fiber clusters to non-agglomerated nano-fibers).

2. The member of claim 1, wherein the surface roughness of the coating material provides a fused toner image with a gloss level in a range from about 30 ggu to about 70 ggu.

3. The member of claim 1, wherein the plurality of ceramic nanofibers are formed of a material selected from the group consisting of alumina, silica, zirconia, titania, silicon carbide, silicon nitride, tungsten carbide, and a combination thereof.

4. The member of claim 1, wherein each ceramic nanofiber of the plurality of ceramic nanofibers is selected from a group consisting of a calcined ceramic, a tabular ceramic, a fumed ceramic, and a combination thereof.

5. The member of claim 1, wherein the plurality of ceramic nanofibers have having an average aspect ratio ranging from about 10 to about 100, and an average length ranging from about 20 nm to about 400 nm.

6. The member of claim 1, wherein the plurality of ceramic nanofibers are present in an amount ranging from about 0.01% to about 60% by weight of the total coating material.

7. The member of claim 1, wherein the nano-fiber cluster has an average cluster size ranging from about 5 μm to about 15 μm.

8. The member of claim 1, wherein, when the non-agglomerated nano-fiber and the nano-fiber cluster are both present in the polymer matrix, a ratio of the nano-fiber cluster over the non-agglomerated nano-fiber ranges from about 10 to about 1 by weight.

9. The member of claim 1, wherein the polymer matrix comprises one or more polymers selected from the group consisting of a fluoroelastomer, a fluoroplastic, a silicone elastomer, a thermoelastomer, a resin, a fluororesin, and a combination thereof;

wherein the fluoroelastomer comprises a curing site monomer and a monomeric repeat unit selected from the group consisting of a vinylidene fluoride, a hexafluoropropylene, a tetrafluoroethylene, a perfluoro(methyl vinyl ether), a perfluoro(propyl vinyl ether), a perfluoro (ethyl vinyl ether), and a combination thereof; and wherein the fluoroplastic comprises a material selected from the group consisting of a polytetrafluoroethylene, a copolymer of tetrafluoroethylene and hexafluoropropylene, a copolymer of tetrafluoroethylene and perfluoro (propyl vinyl ether), a copolymer of tetrafluoroethylene and perfluoro(ethyl vinyl ether), a copolymer of tetrafluoroethylene and perfluoro(methyl vinyl ether), and a combination thereof.

10. The member of claim 1, further comprising one or more particle fillers dispersed in the polymer matrix, wherein the one or more particle fillers are selected from the group consisting of copper, aluminum oxide, nano-alumina, titanium oxide, silver, aluminum nitride, nickel, silicon carbide, silicon nitride, and a combination thereof.

11. The member of claim 1, wherein the substrate is a cylinder, a roller, a drum, a belt, a plate, a film, a sheet, or a drelt.

12. The member of claim 1, wherein the substrate is formed of a material selected from the group consisting of a metal, a plastic, and a ceramic, wherein the metal comprises a material selected from the group consisting of an aluminum, an anodized aluminum, a steel, a nickel, a copper, and a mixture thereof, and wherein the plastic comprises a material selected from the group consisting of a polyimide, a polyester, a polyetheretherketone (PEEK), a poly(arylene ether), a polyimide, and a mixture thereof.

13. A fusing method comprising:

forming a contact arc between a coating material of a fuser roll and a backup member; wherein the coating material comprises a plurality of ceramic nanofibers disposed in a polymer matrix, wherein the plurality of ceramic nanofibers are (a) dispersed in the polymer matrix as nano-fiber clusters having an average cluster size ranging from about 5 μm to about 20 μm or (b) disposed in the polymer matrix as a combination of nano-fiber clusters and non-agglomerated nano-fibers at a ratio of from about 20 to about 1 by weight (nano-fiber clusters to non-agglomerated nano-fibers), and wherein the coating material has an average surface roughness ranging from about 0.1 μm to about 1.5 μm, and passing a print medium through the contact arc such that toner images on the print medium contact the coating material and are fused on the print medium, wherein the fused toner images on the print medium have a gloss level ranging from about 30 ggu to about 70 ggu.

14. The method of claim 13, wherein the toner images are fused on the print medium at a temperature ranging from about 93° C. (200° F.) to about 232° C. (450° F.).

15. The method of claim 13, wherein the coating material has a thickness ranging from 5 μm to about 100 μm.

16. The method of claim 13, wherein the coating material has a thermal diffusivity ranging from about 0.01 $mm^2/s$ to about 0.5 $mm^2/s$, and a thermal conductivity ranging from about 0.01 W/mK to about 1.0 W/mK.

17. A fusing system comprising:

a fuser roll comprising an outermost layer, wherein the outermost layer comprises a plurality of ceramic nanofibers and a polymer matrix, wherein the plurality of ceramic nanofibers are (a) dispersed in the polymer matrix as nano-fiber clusters having an average cluster size ranging from about 5 μm to about 20 μm or (b) disposed in the polymer matrix as a combination of nano-fiber clusters and non-agglomerated nano-fibers at a ratio of from about 20 to about 1 by weight (nano-fiber clusters to non-agglomerated nano-fibers); and a backup roll configured to form a contact arc with the fuser roll to fuse toner images on a print medium that passes through the contact arc, wherein the outermost layer of the fuser roll has an average surface roughness ranging from about 0.1 μm to about 1.5 μm such that the fused toner images have a gloss level ranging from about 30 ggu to about 70 ggu.

18. The system of claim 17, wherein the outermost layer of the fuser roll has a thermal diffusivity ranging from about 0.01 $mm^2/s$ to about 0.5 $mm^2/s$, and a thermal conductivity ranging from about 0.01 W/mK to about 1.0 W/mK.

19. The system of claim 17, wherein the outermost layer of the fuser roll has a tensile strength ranging from about 1,000 psi to about 4,000 psi, an elongation ranging from about 50% to about 500%, a toughness ranging from about 1,000 in.-lbs./$in.^3$ to about 5,000 in.-lbs./$in.^3$, and an initial modulus ranging from about 500 psi to about 1,500 psi.

20. The system of claim 17, wherein the polymer matrix comprises one or more polymers selected from the group consisting of a fluoroelastomer, a fluoroplastic, a silicone elastomer, a thermoelastomer, a resin, a fluororesin, and a combination thereof.

* * * * *